Patented Nov. 12, 1940

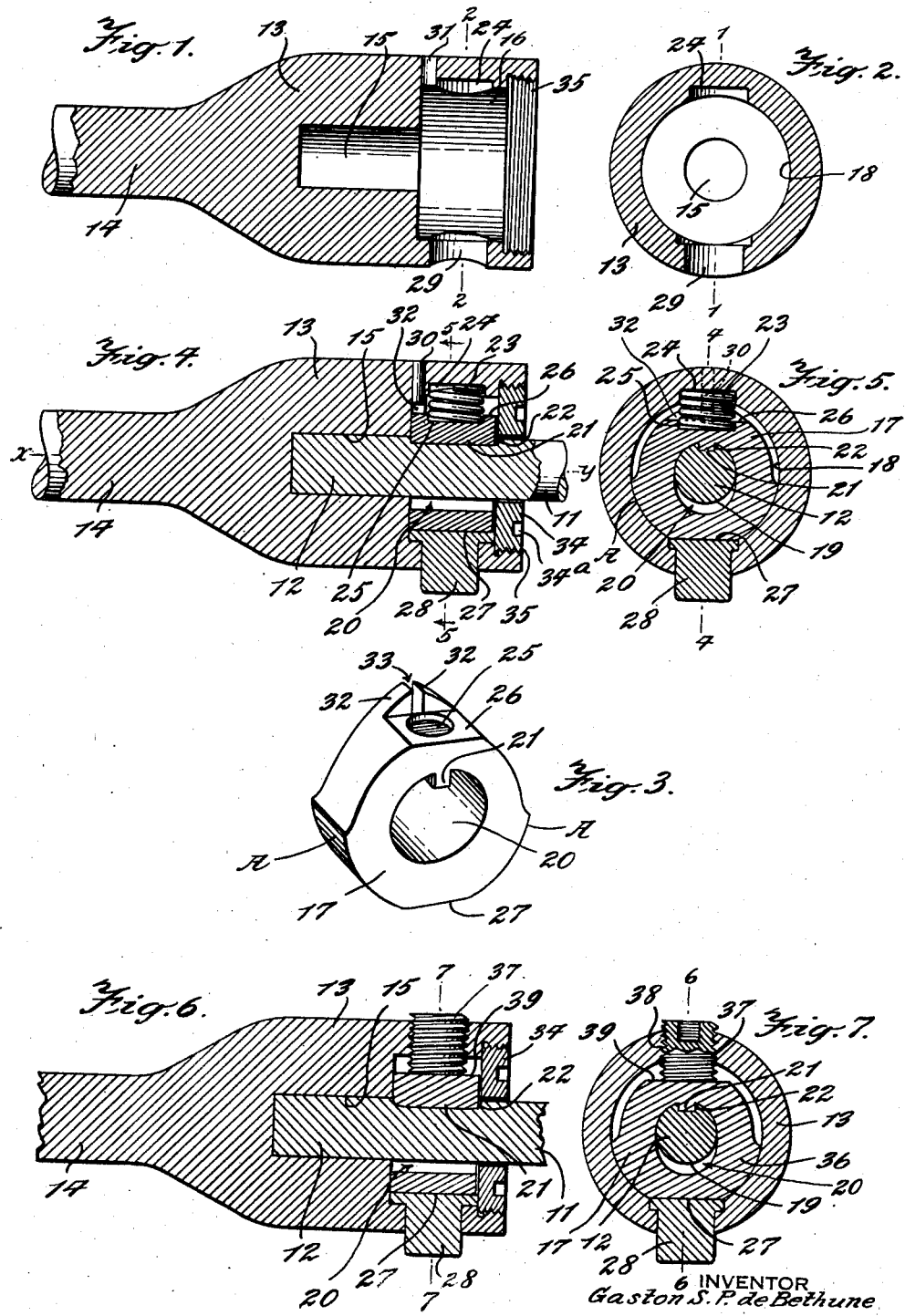

2,221,371

UNITED STATES PATENT OFFICE 2,221,371

SHAFT COUPLING

Gaston S. P. de Bethune, New York, N. Y.

Application February 11, 1938, Serial No. 190,015

3 Claims. (Cl. 287—119)

This invention relates to coupling devices, especially to coupling means by which, in power transmitting mechanism, a driving member is securely coupled in line with a driven member, and relates more particularly to such a coupling mechanism in which a driven shaft partakes of the motion of a driving shaft.

For purposes of ready identification the assembled members will be hereinafter referred to by their respective diameters at the coupling rather than by their functional operation.

An object of the invention is to provide that the coupling parts shall be encased in a cavity within the larger shaft, and shall include exterior means, such as a push-button, protruding from the said cavity, by which the encased parts of the coupling may be operated from the outside.

Another object of the invention is to provide such an interior coupling device with a ring-shaped locking member having a transversely elongated, preferably oval, central opening, and formed with a key adapted to engage a keyway with which the smaller shaft is provided, the peripheral wall of the ring being adapted to be biased against the inner wall of the said cavity by suitable means, thereby causing the two shaft elements to be securely locked together for simultaneous movement.

Still another object is to provide that when the key is seated in the keyway, it will be maintained therein by the pressure of a spring, except when the said spring is compressed by outside pressure upon said button to retract the key from the keyway, the two shaft elements being then in such relative position that they may be disengaged from each other and disassembled.

A cognate object is to provide a resilient cushion between the said locking ring and the inner wall of the said cavity.

Another object of notable importance is to provide that when the coupled shafts are rotating and thereby generating centrifugal accelerations in the various parts of the coupling, the resulting centrifugal force acting on the movable parts shall tend to maintain the key in the keyway, and, furthermore, that the pressure of the said spring, which tends also to maintain the key in the keyway, shall be in the same direction as the said resulting centrifugal force.

Among ancillary objects of the invention is to provide, at least when the shaft components are to be disengaged, that the uncoupling shall be controlled by positive manual action exerted from the exterior of the housing of that shaft component by which the parts of the coupling device are encased.

A further object is to provide, as an alternative construction, a form of external controlling means for an interior coupling device, which includes a locking ring of the novel character already mentioned and also a set screw adapted to act positively rather than resiliently, for the purpose of setting the locking ring in both of its positions, viz., to move the coupling ring positively to a position for coupling the shaft components and selectively to a position for uncoupling said shaft components.

Other objects and features of the invention will appear as the description of the particular physical embodiment of the invention selected for illustration progresses.

In the accompanying drawing like characters of reference have been applied to corresponding parts throughout the several views, in which:

Fig. 1 is a view in vertical longitudinal section of a coupling component shaft in the construction of which the present invention has been embodied, taken on the line 1—1 of Fig. 2;

Fig. 2 is a vertical transverse section on the line 2—2 of Fig. 1;

Fig. 3 is a detail view in perspective of a locking ring constituting a coupling component;

Fig. 4 is an assembly view of the coupling components, taken in vertical, longitudinal section, taken along line 4—4 of Fig. 5;

Fig. 5 is a view in vertical, transverse section, taken on the line 5—5 of Fig. 4;

Fig. 6 is a view of a modified form of coupling structure embodying the invention, the assembled parts being shown in vertical, longitudinal section, taken along line 6—6 of Fig. 7, and Fig. 7 is a vertical transverse section taken on the line 7—7 of Fig. 6.

In a now-preferred embodiment of the invention selected for illustration and description to permit ready and complete understanding thereof, the part designated by the reference character 11 is a shaft, the end 12 of which is assembled in telescopic relation with the end 13 of a complemental shaft 14, which is shown as having at 15 an axial bore fitted to the shaft end 12 and serving as a bearing therefor, being enlarged at 16 in pursuance of an important feature of the present invention; i. e. to provide a cavity of generally cylindrical contour, in the instance shown, for the reception of the coupling parts, which will now be described.

The coupling device proper comprises a locking ring 17, which may be of any suitable contour to effect the desired purposes, and which is desirably of the somewhat oval form illustrated, for reasons which will become apparent as the description thereof proceeds.

In the instance shown the locking ring 17 has an over-all diameter, on the axis 4—4, sufficiently smaller than the diameter of the cavity 16 to permit play of the ring bodily along said transverse axis, within the cavity, and relatively both to the inner wall 18 of the cavity, and to the periphery 19 of the shaft end 12 by which end the ring is transfixed, along the axis of symmetry x—y of the shafts 11 and 14 in their telescopically assembled position, as shown in Fig. 4.

The locking ring 17 has a centrally disposed orifice indicated by the reference character 20 adapted to permit the passage therethrough of the shaft end 12, and sufficiently larger than said shaft to permit the transverse movement of the ring which is requisite to provide for coupling and uncoupling movements of the ring, within the cavity 16, and with relation to the shaft parts 12 and 13.

Preferably the orifice 20 will be of a contour approximately oval, as shown, and its walls are provided with a key 21, adapted to lock in a peripheral keyway 22 formed longitudinally of the shaft 12.

This locking position is shown in Figs. 4 and 5 and in the form of the invention illustrated in Figs. 1 to 5, inclusive, the ring is maintained in said locking position by the resilient pressure applied by a coiled spring 23.

This spring is braced against the inner wall 18 of the cavity 16 and conveniently may have its ends seated within shallow recesses 24 and 25 formed respectively in said wall 18 and in the opposed, slabbed off face 26 of the ring.

Diametrically opposite the region of the spring, the locking ring has another slabbed off face 27 against which is seated the upper face of a push-button 28 which protrudes through an aperture or socket 29 piercing the wall of the shaft cavity 16.

As long as the parts occupy their relative position as illustrated by Fig 5, the shafts will co-rotate regardless of which shaft drives and which is driven.

The form of device shown in Figs. 1 to 5, inclusive, has the further advantage that the coupling action of the locking ring is completed automatically by the pressure of the spring 23 as soon as the key 21 is brought into registry with the keyway 22. All of the parts should be dimensioned to fit accurately, so as to prevent end-shake, side-shake, or chattering, etc.

A dowel pin 30 may desirably be disposed in an orifice or socket 31 formed in the wall of the cavity 16 and adapted to extend into the cavity for a predetermined distance for the purpose of preventing casual rotative displacement of the inner parts relative to each other. In the perspective view of the locking ring 17 shown in Fig. 3 the ring is illustrated as having shoulders 32 providing an intervening slot 33 adapted to receive slidingly the dowel pin 30 and co-operate in the function of holding the ring in fixed position with respect to the outer member.

It may be here noted that the pin 30 should not protrude into cavity 16 a distance which would preclude, by the pin's engagement with the locking ring, the movement of said ring upwardly to an extent sufficient to release the key from the keyway.

On the side opposite the location of the spring, the locking ring has two outer, cylindrically shaped, faces A so dimensioned in diameter that, when the key 21 is engaged in the keyway 22, the said faces A are braced against the inner wall 18 of the cavity 16, thereby co-acting with the pin 30 inserted in the slot 33 to prevent any rotational movement of the locking ring relatively to the shaft 14.

Moreover, but not illustrated in the drawing for the sake of clarity, as will be readily understood, shoulders similar to 32 may be provided extending from the face 27 for co-action with another pin similar to 30 provided diametrically opposite said pin 30, and destined to restrict the movement of the locking ring 17 to a translation parallel to the line 4—4. The dimensions of the button 28 can easily be adapted to this end.

Furthermore I provide that either the faces A, or the wall 18, or both, may be partially or totally covered with a resilient layer, such as a sheet of rubber or paper, constituting a cushion, thereby providing complete resiliency for the locking ring. This feature is particularly advantageous when the conditions of service are such that the assembled shafts may be operated through a wide range of speed, because, in the vicinity of any critical speed, said resilient cushion will coact in avoiding excessive vibration.

The open end of the cavity 16 may be closed by suitable means, such as the closure disc 34 threaded exteriorly to screw into the interiorly threaded mouth 35 of cavity 16. This closure disc 34 is provided with sockets 34a for the application of a spanner wrench to aid in its insertion and withdrawal.

Assembly may be readily accomplished by positioning the locking ring 17 in the cavity 16 with the shoulders 32 embracing the pin 30 and the spring 23 seated at top and bottom in its respective recesses 24 and 25. Thereafter, and either before or after emplacement of the closure disc 34, upon thrusting inward of the button 28 and thereby raising the locking ring 17 with its key 21, the shaft 11 may be inserted through the locking ring 17 with its end 12 seated in its bearing 15. If care is taken to insert the end shaft 12 so that the keyway 22 and the key 21 are substantially in the same plane, the key and keyway will come naturally into registry; otherwise the shaft 11 may be rotated until the keyway 22 is brought into registry with the key 21, whereupon locking engagement is effected. The shaft elements may be disassembled simply by the application inward of sufficient pressure upon the button to retract the key from the keyway, whereupon the shaft 11 may be withdrawn.

From the foregoing it will be clear that the actuation of the coupling device requires a positive action upon the control button 28, whether effected manually as herein illustrated and described, or by any suitable mechanism (not shown) which will press the button or equivalent external means acting to operate the internal coupling mechanism.

In the modification illustrated in Figs. 6 and 7, provision is made of means, operable manually in a positive manner, to set the coupling ring 36 in the locked position shown in Fig. 7, such means taking the form, in the instance shown, of a set screw 37, shown in elevation in Fig. 6 and in partial section in Fig. 7, which enters a threaded orifice 38 in the wall cavity 16 and is seated firmly against a slabbed-off face 39 of the ring.

I wish to point out that, when the coupled members are intended for simultaneous translation, or for combined translation and rotation, provision should be made that the key 21 fits longitudinally in the keyway 22, as shown in Figs. 4 and 6, so that any force tending to slide one member in regard to the other member may be overcome by such fit. This latter condition applies, also, in a purely rotative movement, to absorb any thrust acting differentially on one of the members. Obviously the key 21 may be a simple pin protruding into the oval orifice 20 and adapted to fit tightly in a recess formed in the inner member, or the inner member may have a key or a pin registering with an adequate recess of the ring in the oval orifice 20, without departing from the scope of the present invention. Such arrangements would also be very effective in preventing any sliding, or absorbing any thrust.

When the coupled members are intended to be rotated, it is obvious that, in order to obtain a smooth running, the rotating masses of the parts of the coupling, and of the portions of the members in the region of the coupling, must be dynamically balanced, which is always possible by providing for them adequate dimensions with an adequate choice of materials. For example, the spring 23 may be made of steel, and the button 28 may be made hollow or of a light material.

The ring 17 (or 39) shall preferably be made so that its center of gravity shall be decentered from the line $x$—$y$, in a direction away from the key 21, so that the centrifugal force acting on the ring shall tend to lock the key 21 in the keyway 22, and to act in the same direction as the locking force exerted by the spring 23 (or the set screw 37). The centrifugal force acting on the button 28 acts also in the same direction, tending to throw it out of the socket 29, and it must be maintained therein by adequate means, such as a collar fitting in an inside recess formed in the cavity 16, as shown in the Figs. 2, 5 and 7, for example. On the spring 23 itself a centrifugal force is acting in the direction opposed to the locking force exerted on the ring 17, and the said locking force shall preferably be greater than the said centrifugal force.

By properly adjusting the various elements of the coupling, its operation may be rendered absolutely safe under the action of centrifugal force, and I do not know of any coupling device possessed of such character of safety.

Although the shape of the locking device herein described, in the general form of a ring having an oval orifice, offers distinct advantages, such as sturdiness, easiness of a resilient mounting, low cost of manufacture, safety and easiness of operation, it appears very clearly from this specification that any other adequate locking device inserted within the cavity 16 could be used instead of the ring 17 or 39, provided that such device had the fundamental characteristics of said rings, viz.: to be adapted (1) to receive pressure forces in two opposite directions; (2) to interlock with the inner member and to be braced against the outer member; (3) to have its center of gravity adequately decentered from the axis $x$—$y$; (4) to be mounted resiliently; (5) to be unlocked by exterior means.

Consequently, the invention is not to be construed as limited to the particular shape of the locking element herein described.

What I claim is:

1. A coupling of the class described, for assembly of a driving member and a driven member, one of said members having a cavity into which the other member fits telescopically, comprising a movable locking ring mounted in said cavity, means for moving said ring into position for interlocking and unlocking said members, said locking ring having a peripheral recess defined by a pair of spaced shoulders, and the inner wall of said cavity being provided with means to enter said recess and prevent relative rotation as between said locking ring and the surrounding wall.

2. A coupling of the class described, for assembly of a driving member, and a driven member, one of said members having a cavity into which the other member fits telescopically, comprising a movable locking ring mounted in said cavity, means for moving said locking ring into position for interlocking and unlocking said members, said locking ring having a peripheral recess defined by a pair of spaced shoulders, and the inner wall of said cavity being provided with means to enter said recess and prevent relative rotation as between said locking ring and the surrounding wall, and a closure disc adapted to retain the coupling elements in their assembled position independently of said locking action of said ring.

3. A shaft coupling having a ring enclosed within a cavity of one of the shafts, said cavity being concentric to the axis of symmetry of the coupled shafts, said ring having an oval center space for passage of one of the shafts, and a key in said oval space adapted to lock in a keyway of said latter shaft, and a spring for maintaining the key within the keyway.

GASTON S. P. DE BETHUNE.